United States Patent [19]

Lowrie

[11] 4,221,577
[45] Sep. 9, 1980

[54] GAS-LIQUID SEPARATOR

[75] Inventor: Neely E. Lowrie, Tulsa, Okla.

[73] Assignee: Combustion Engineering, Inc., Windsor, Conn.

[21] Appl. No.: 26,495

[22] Filed: Apr. 3, 1979

[51] Int. Cl.² .......................................... B01D 45/12
[52] U.S. Cl. ...................................... 55/392; 55/391; 55/426; 55/457
[58] Field of Search ................ 55/184, 201, 204, 391, 55/423, 424, 426, 457, 466, 392, 399, 455

[56] References Cited

U.S. PATENT DOCUMENTS

| | | | |
|---|---|---|---|
| 1,007,289 | 10/1911 | Jeffreys | 55/423 |
| 1,754,126 | 4/1930 | Stievenart | 55/466 |
| 1,897,332 | 2/1933 | Raymond | 55/204 |
| 2,037,426 | 4/1936 | McKeever | 55/184 |
| 2,547,190 | 4/1951 | Wilson | 55/184 |
| 2,607,438 | 4/1952 | Bailey | 55/423 |
| 2,859,832 | 11/1958 | Lankenau | 55/426 |
| 3,877,904 | 4/1975 | Lowrie | 55/184 |
| 3,988,132 | 10/1976 | Oranje | 55/457 |

FOREIGN PATENT DOCUMENTS 319324  11/1902  France ....................................... 55/424

Primary Examiner—David L. Lacey
Attorney, Agent, or Firm—Arthur L. Wade

[57] ABSTRACT

A vertical, cylindrical vessel receiving gas and entrained liquid to be separated. Within the cylindrical vessel are baffle surfaces spaced from the internal wall of the vessel arranged to receive the gas and entrained liquid thereon. Elongated structure is attached to the lower internal baffle surface and extends to the internal wall of the vessel to form a path for liquids flowing downwardly on the internal surfaces.

2 Claims, 2 Drawing Figures

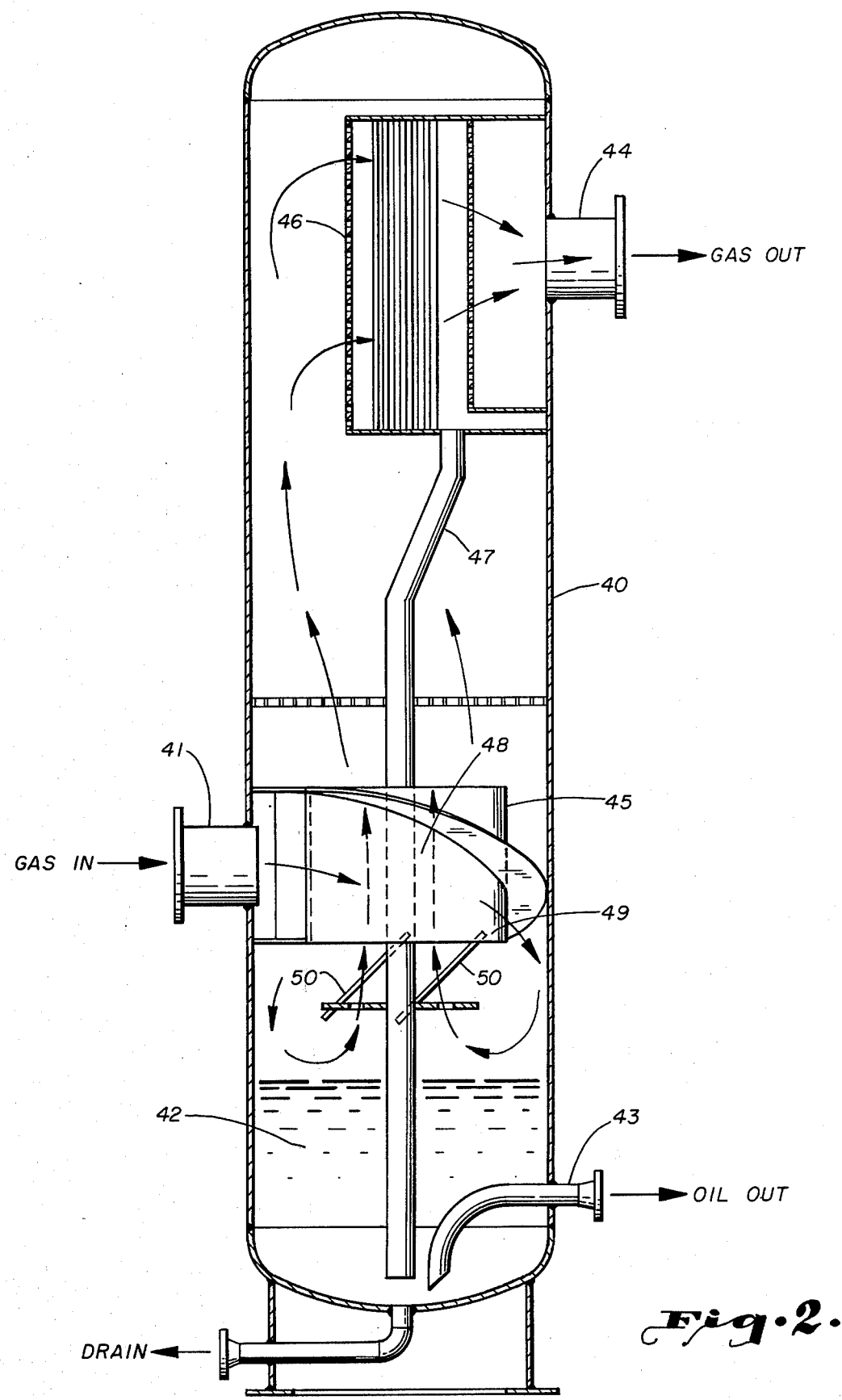

GAS-LIQUID SEPARATOR

BACKGROUND OF THE INVENTION

1. Field of the Invention

The present invention relates to control of the flow of liquid and gas after their separation to maintain their separation by providing a flow path for the liquids which militate against reentrainment of the liquids by the gas. More specifically, liquid initially separated from gas in which the liquid has been entrained is flowed downward over a surface upon which the gas and liquid impinge and along a mechanically provided path in isolation from the separated gas.

2. Description of the Prior Art

There are many configurations of baffles mounted in vessels which provide surfaces promoting separation of liquid and gas mixtures passed through the vessels. The vessels are usually cylindrical because this form of vessel is generally simple and relatively inexpensive to manufacture. When expanded capacity must be accommodated, the vessels may be extended vertically and/or their diameter increased.

One of the most effective techniques of separation is to impinge the mixture upon a baffle surface and then flow the liquid down along this surface to join a lower collection of the liquid from which the liquid can be drawn from the vessel in separation from the gas. To bring about liquid impingement, mixtures have been given a circular flow path to generate centrifugal force upon the liquid which will move the liquid into baffle surface contact. Generally, centrifugal force has been generated in vertical vessels in which vertical baffles are mounted. However, in at least one part of these flow paths, there remains a maximum likelihood of reentrainment of the liquid by the gas. Where the liquid impinged on a baffle mechanically disengages therefrom and falls to a lower collection of liquids, direction must be given the falling separated liquid which will obviate reentrainment.

In the system disclosed in my U.S. Pat. No. Lowery 3,877,904 dated Apr. 15, 1975, I provided for part of the separated gas to force separated liquid falling from the lower edge of a baffle surface into a path which would avoid reentrainment by the major portion of the separated gas. Specifically, I provided a perforated horizontal plate traverse the vertical shell sized to be smaller than the internal wall of the vessel. I thus provided a path for part of the separated gas to sweep the liquid drops falling from the edge of the upper baffle surface. The falling drops were swept around the edge of the plate and subsequently disengaged from the small portion of the separated gas to fall into the separated liquids below. The small portion of the separated gas disengaged from the liquid and then flowed upward through the perforations of the horizontal plate and out the vessel with the remaining separated gas.

Experience subsequent to the development of the system of my U.S. Pat. No. 3,877,904 has shown further direction must be provided for the descending liquid drops on the baffle surface. It became evident that a mechanical provision was required to direct liquid from the lower edge of the baffle surface to the separated liquid on the internal wall of the vessel.

STATEMENT OF THE INVENTION

The present invention provides a plurality of elongated structures attached to the lower edge of the lower baffle surfaces and extending to the internal wall of a vessel to form a mechanical path for liquid impinged upon the baffle surface to adhere thereto and flow into previously separated liquids.

The present invention further provides mechanical structure in the form of rod-like members attached by a first of their ends to the lower edge of the lower baffle surface and extending their second ends at an angle to the horizontal to the internal wall of a vessel.

Other objects, advantages and features of this invention will become apparent to one skilled in the art upon consideration of the written specification, appended claims, and attached drawings.

BRIEF DESCRIPTION OF THE DRAWINGS

FIG. 2 is a separator similar to that shown in FIG. 1 with a cylindrical baffle mounted in a lower part of the separator, which baffle also includes structure embodying the present invention.

DESCRIPTION OF THE PREFERRED EMBODIMENT

Figure 1:
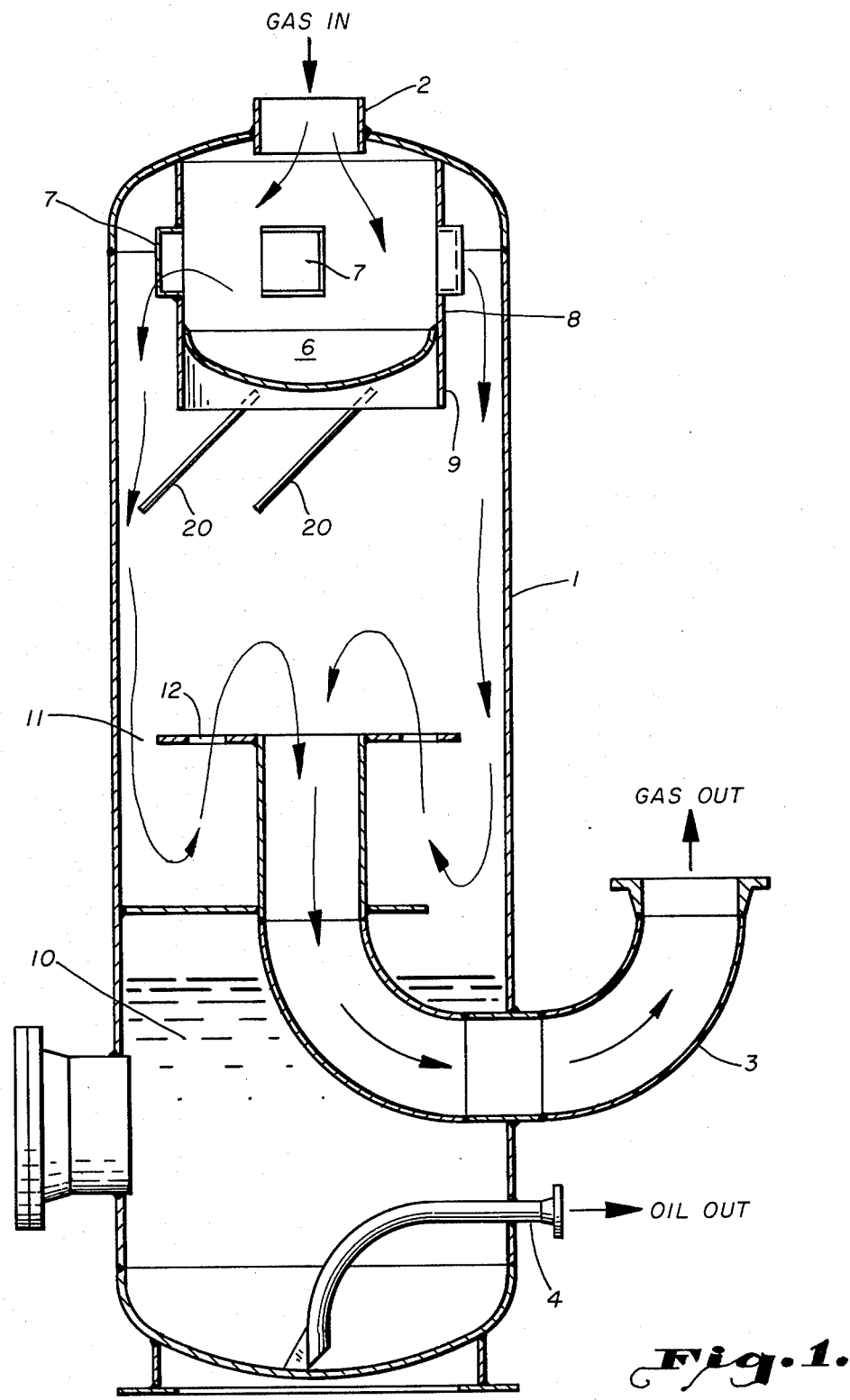
FIG. 1 is a sectioned front elevation of a separator vessel having a cylindrical baffle surface in its upper portion provided with structure embodying the present invention.

Referring to the drawings, a vertical, cylindrical shell 1 is shown, sectioned to disclose the flow path of fluids into, therethrough, and therefrom. Gas with entrained liquid is flowed into the shell 1 through inlet 2. After the mixture has been separated, the gas discharges from outlet 3. The liquid discharges from outlet 4.

In FIG. 1, the gas and its entrained liquid are brought into the vessel through inlet 2 and down into the compartment formed by the cylindrical chamber 6 which is attached to and depends from the top of shell 1. The gas and entrained liquid flow from cylindrical chamber 6 through nozzles 7 which extend from the vertical sides of the chamber opening into the annulus between the external sides of chamber 6 and the internal wall of shell 1.

Nozzles 7 are formed and directed to force the gas to spiral downwardly in the annulus. This spinning gas flows downwardly in the annulus and discharges through outlet 3. The liquids entrained by the gas impinge upon the internal surfaces of nozzles 7 and the majority of the liquid is forced to the internal wall of shell 1. The present invention is concerned with the liquids which adhere to the surfaces of the nozzles and travel downwardly from those nozzles along the external surfaces of chamber 6.

In disclosing the present invention the outside cylindrical surface of chamber 6 and its attachments will be referred to as a baffle structure which provides two surfaces. The internal surfaces of the nozzles 7 and the adjacent surface of the baffle may be referred to as the first of these surfaces 8. The lower surface of the baffle is designated 9.

First surface 8 of the baffle is adjacent to lower surface 9 of the baffle. Liquid separated from its entraining gas impinged upon the surfaces of the nozzles is disclosed as flowing downwardly from upper baffle surface 8 onto connecting lower baffle surface 9. Finally, the liquid reaching the lower edge of baffle surface 9 was formerly scheduled to fall therefrom and be vulnerable to being swept into reentrainment in the gas destined to exit from outlet 3. However, the present invention positively circumvents this reentrainment.

In my prior U.S. Pat. No. 3,877,904 liquid falling as drops from the lower edge of surface 9 was swept downwardly to the lower collection 10. As explained previously, the liquid of collection 10 is withdrawn at outlet 4. If a portion of the separated liquid falls from the lower edge of surface 9, it will be expected to join collection 10 through passage 11 which is provided between the edge of perforated plate 12 and the internal wall of shell 1. The present invention may well provide a path for all separated liquid from the lower edge of surface 9. Therefore, whether under the arrangement provided by my previous patent or by my novel structure now disclosed, all separated liquid descending along surface 9 will be positively directed to collection 10.

The structure provided, and embodying the present invention, is disclosed as a plurality of cylindrical rods 20. Rods 20 are attached by their first upper ends to the lower edge of the lower surface 9. Rods 20 extend their second ends from their attachment at lower surface 9 to the internal surface of shell 1. Further, the rods 20 are extended at an angle to the horizontal. Liquids traveling downwardly from surface 8 and surface 9 can be reasonably expected to flow along the mechanical path provided by the surface of rods 20 until they join the liquid on the internal surface of shell 1.

The direction given to the liquid discharged from nozzles 7 is expected to descend in a spiral along the surfaces 8 and 9. This liquid adhering to these surfaces, and traveling downwardly over them, is expected to reach the lower edge of surface 9 and travel to the nearest rod 20 surface. Transferring adherence from surface 9 to the surface of rods 20, the liquid will continue its downward travel along the inclined surfaces of rods 20 until it reaches the internal surface of shell 1. Downward travel of the liquid continues its adherence transfer from the rods 20 to the internal surface of shell 1 until the collection 10 is reached. The inclination of rods 20 to the horizontal is in the direction of the downwardly spiraling fluid to promote the ready transference of adherence from surface 9 to rods 20 and, finally, to the internal surface of shell 1.

Tests of actual reduction to practice of this invention establish that this path provided by rods 20 essentially transports all the separated liquid, as it descends, militating against its reentrainment by the separated gas flowing to conduit 3. Thus, the present invention, embodying rods 20, can be regarded as acting independently as a positive path for liquids from baffle surfaces 8, 9, or as an additional path to that provided by my invention of U.S. Pat. No. 3,877,904.

Referring now to FIG. 2, vertical separator shell 40 is disclosed as receiving gas with entrained liquid through inlet 41. Liquid entrained by the gas received through 41 is separated within shell 40. The liquid is collected in body 42 and withdrawals from this body exit the shell 40 though outlet 43. The separated gas exits shell 40 through outlet 44.

By the use of the drawing convention of a sectioned elevation, the gas-liquid mixture is disclosed as directed to the internal walls of cylinder 45. Cylinder 45 is mounted within shell 40, its walls being concentric with the internal walls of shell 40. From another view, the cylinder 45 can be described as coaxial with shell 40.

Cylinder 45 represents many variations of this form of baffle which can be used in separators to form the flow path for fluids into a vortex. The fluids are received tangentially upon the internal surface of cylinder 45, the liquids being forced to impinge upon the internal wall of cylinder 45 and the lighter gas spiralling upwardly from the top of cylinder 45.

An additional structure 46 is represented at outlet 44. This structure 46 may take various forms, not pertinent to the present invention. Structure 46 may be some form of contacting device which will receive entrained liquid in the upwardly spiralling gas, collect this liquid, and conduct it to the lower portion of shell 40 through conduit 47.

The present invention is concerned with the separated liquid forced to the internal wall of cylinder 45. This liquid is expected to gravitate from the internal surface of cylinder 45 and fall to the lower portion of shell 40, where it is collected in body 42 for withdrawing through outlet 43. The problem that descends is brought about by the turbulence of the gas which swirls from the inside of cylinder 45.

The vortexed gas is usually very high in volume relative to the liquid. The gas is forced from both the top of the cylinder 45 and the bottom. There is the real danger that the swirling gas, forced out of the lower end of cylinder 45, will be swept up and will reentrain the separated liquid as it falls from the surfaces of cylinder 45.

It is expected that a larger portion of the separated liquid will be thrown in a downward spiral from cylinder 45 and impinge upon and adhere to the internal walls of shell 40. However, the present invention faces the reality that much of the liquid will drop more or less vertically from the lower edge of cylinder 45.

Under the concepts of the present invention, cylinder 45 is disclosed as functioning as a baffle structure upon whose surfaces the fluids of inlet 41 impinge. In FIG. 2, the internal surfaces of cylindrical baffle 45 are divided into an upper surface 48 and lower surface 49. As in FIG. 1, liquid separating from the gas and adhering to the internal surface of cylindrical baffle 45, flows downwardly on the upper surface 48 and onto the connecting lower surface 49. It is from the lower edge of surface 49 that the liquid adhering threto must be disnegaged and positively directed to the lower collection 42.

As in FIG. 1, rod-like members 50 are attached to the lower edge of surface 49 to form a mechanical path to positively flow the liquid from the lower edge of surface 49 to the internal wall of shell 40. Compatible with the function of the FIG. 1 structure, the liquid flowing downwardly on the surfaces 48 and 49 of cylindrical baffle 45 adheres to and follows the surface of rods 50 to the internal wall of the shell 40. Travel of the liquid is then positively directed by its transfer of adherence along the surfaces until it reaches collection 42 and ultimate withdrawal through outlet 43. Thus, reentrainment of the liquid into the violently spiralling gas below cylindrical baffle 45 is largely avoided. Conclusion:

Strenuous attempts have been made to overcome the terminology difficulties in describing the present invention. In both drawings, a baffle structure is first presented as embodying the present invention. In FIG. 1, this baffle structure is the cylindrical chamber 6. In FIG. 2, this baffle structure is represented by the cylinder 45.

The elongated structure attached to the lower edge of the cylindrical baffles is embodied in the rods 20 of FIG. 1 and the rods 50 of FIG. 2. It has appeared desirable to disclose and claim this elongated structure as the lower portion of the cylindrical baffle surfaces. To disclose this attachment clearly, the baffle structures have each been depicted as including an upper surface and an attached contiguous lower surface. The liquid is impinged upon the upper baffle surface. This emphasizes the initial separation of the liquid from its entraining gas. The liquid flows downwardly along this upper surface while adhering thereto. With the lower surface connected to the upper surface, the liquid can then be described as transferring from the upper to the lower surface.

Defining the lower surface provides the opportunity of describing specifically where the elongated (rod-like) members are attached in forming the mechanical path. The liquid can then be described as flowing along upper and lower surfaces to reach the surface of the rods and positively flow along the rod surfaces without danger of reentrainment in the gas swirling about the rods.

Descriptively breaking up the baffle surface to which the liquid adheres should make clear the fact that the liquid travels downwardly over the baffle surface when that surface is external as in FIG. 1 or internal as in FIG. 2. The common denominator between the baffles is in the rod attachment to the lower edge of the surfaces.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A separator for liquid and gas, including,
a cylindrical shell mounted vertically,
an inlet through the wall of the shell conducting gas in which liquid is entrained,
a cylinder mounted within the shell and comprising a first curved baffle surface upon which is directed the gas and entrained liquid and mounted such that liquid is forced to impinge upon and adhere to the first surface and gas is directed into a spiral path leaving the first surface,
said cylinder further comprising a second baffle surface attached as a downward extension of the first baffle surface which forms a path for the adhering liquid from the first curved baffle surface on which the liquid falls toward collection in the lower portion of the shell,
rods attached by their external surfaces from each of their first ends to the lower edge of the second baffle surface and their second ends extending to near the internal wall of the shell of the separator so as to provide a path along the external surfaces of the rods for descending liquid on the second baffle surface to the internal wall of the shell,
an oulet connected to the upper portion of the shell for the removal of separated gas,
and an outlet connected to the lower portion of the shell for the removal of separated liquid from the lower portion of the shell.

2. The separator of claim 1, wherein, the rods are extended from their first end at an angle to the horizontal in bringing the liquids adhering to their external surfaces to the internal surface of the shell.

* * * * *